US012766901B2

(12) United States Patent
Rieger

(10) Patent No.: US 12,766,901 B2
(45) Date of Patent: Oct. 20, 2026

(54) WHEEL FOR AMPHIBIOUS VEHICLES

(71) Applicant: Bernhard Rieger, Ostfildern (DE)

(72) Inventor: Bernhard Rieger, Ostfildern (DE)

( * ) Notice: Subject to any disclaimer, the term of this patent is extended or adjusted under 35 U.S.C. 154(b) by 408 days.

(21) Appl. No.: 18/686,405

(22) PCT Filed: Aug. 26, 2022

(86) PCT No.: PCT/DE2022/100637
§ 371 (c)(1),
(2) Date: Sep. 13, 2024

(87) PCT Pub. No.: WO2023/025355
PCT Pub. Date: Mar. 2, 2023

(65) Prior Publication Data
US 2025/0242645 A1 Jul. 31, 2025

(30) Foreign Application Priority Data
Aug. 26, 2021 (DE) ..................... 10 2021 122 163.3

(51) Int. Cl.
*B60F 3/00* (2006.01)

(52) U.S. Cl.
CPC .......... *B60F 3/0084* (2013.01); *B60F 3/0038* (2013.01)

(58) Field of Classification Search
CPC ......... B60F 3/00; B60F 3/0084; B60F 3/0038
See application file for complete search history.

(56) References Cited

U.S. PATENT DOCUMENTS 1,104,229 A * 7/1914 Szegel .................. B60F 3/0084 416/86
4,395,237 A 7/1983 Watanabe
2006/0116032 A1* 6/2006 Roering .................. B60F 3/003 440/12.5
2007/0155257 A1* 7/2007 Munshaur ............ B60F 3/0007 440/12.66

FOREIGN PATENT DOCUMENTS

DE 2856157 A1 6/1979
KR 20140008206 A 1/2014

* cited by examiner

*Primary Examiner* — Stephen P Avila

(57) ABSTRACT

A wheel (10*a*, 10*b*) for amphibious vehicles (1) has a rim (100) and a tire contact surface (102) for driving over a solid surface. At least one float (101) designed to hold air and/or gas is provided on the wheel (10*a*, 10*b*) and, when required, able to be brought from a neutral position to a floating position. The float (101) is formed from numerous profiles (1010) pivotable at a defined angle (W) to the wheel plane (E) on the circumference of the rim (100) and/or on the circumference of a receiving means (1000) extending inside the inner circumference of the rim (100). At least one water-tight and flexible and/or elastic material (1012) is arranged on the profiles (1010) and/or connected to the profiles (1010) to form a floating cavity (1011).

14 Claims, 6 Drawing Sheets

WHEEL FOR AMPHIBIOUS VEHICLES

CROSS-REFERENCE TO RELATED APPLICATION

This application is a national stage application, filed under 35 U.S.C. § 371, of International Patent Application PCT/DE2022/100637, filed on Aug. 26, 2022, which claims the benefit of German Patent Application DE 10 2021 122 163.3, filed on Aug. 26, 2021.

TECHNICAL FIELD

The present disclosure relates to a wheel for amphibious vehicles (single or multi-wheeled amphibious bicycles, scooters, motorcycles, etc.).

BACKGROUND

Wheels for amphibious vehicles which are formed from a rim and a tire contact area for driving over solid ground are already known from the prior art; for example, DE 28 56 157 A1 discloses that a float designed to hold air and/or gas is provided on a wheel and, when required, can be brought from a neutral position into a floating position. An airtight float is used here, which is folded up when the gas is released and brought into a rollable shape when it is filled with gas. These floats are attached to the front and rear wheel of the amphibious vehicle using fixed mounting brackets.

The biggest disadvantage with such a wheel or amphibious vehicle is probably the fact that in practice it is virtually unusable due to the design-related excess width of the vehicle. Transporting a bicycle with such dimensions is likely to prove difficult. However, the handling characteristics on land are also likely to be severely impaired due to the design.

SUMMARY

The present disclosure overcomes the aforementioned disadvantages and provides a wheel for an amphibious vehicle, which firstly enables a virtually seamless transition from use on land to water and vice versa and secondly can be used to travel on land without problem.

This is achieved by the wheel for an amphibious vehicle as claimed.

DETAILED DESCRIPTION

Figure 1:
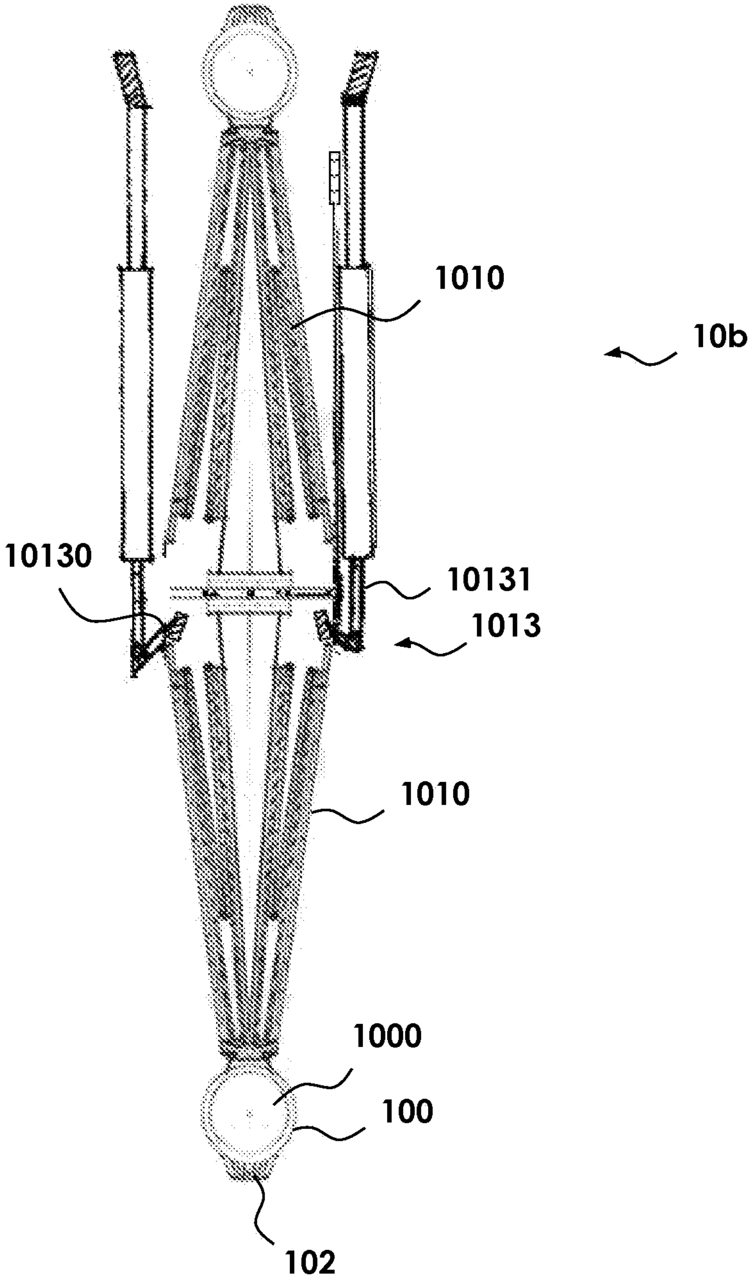
FIG. 1 shows a cross-sectional view of the wheel for an amphibious vehicle in one advantageous embodiment, wherein the pivotable profiles are pivoted in (bearing against)

As evident from FIG. 1, the wheel 10*a*, 10*b* for amphibious vehicles 1 has a rim 100 and a tire contact area 102 for driving over solid ground, with at least one float 101 designed to hold air and/or gas being provided on the wheel 10*a*, 10*b*, which float, as required, can be brought from a neutral position into a floating position.

The float 101 is formed from numerous profiles 1010 pivotable at a defined angle W to the wheel plane E on the circumference of the rim 100 and/or on the circumference of a receiving means 1000 extending inside the inner circumference of the rim 100, at least one water-tight and flexible and/or elastic material 1012 being arranged on the profiles 1010 and/or being connected to the profiles 1010 to form a buoyant cavity 1011.

Figure 2:
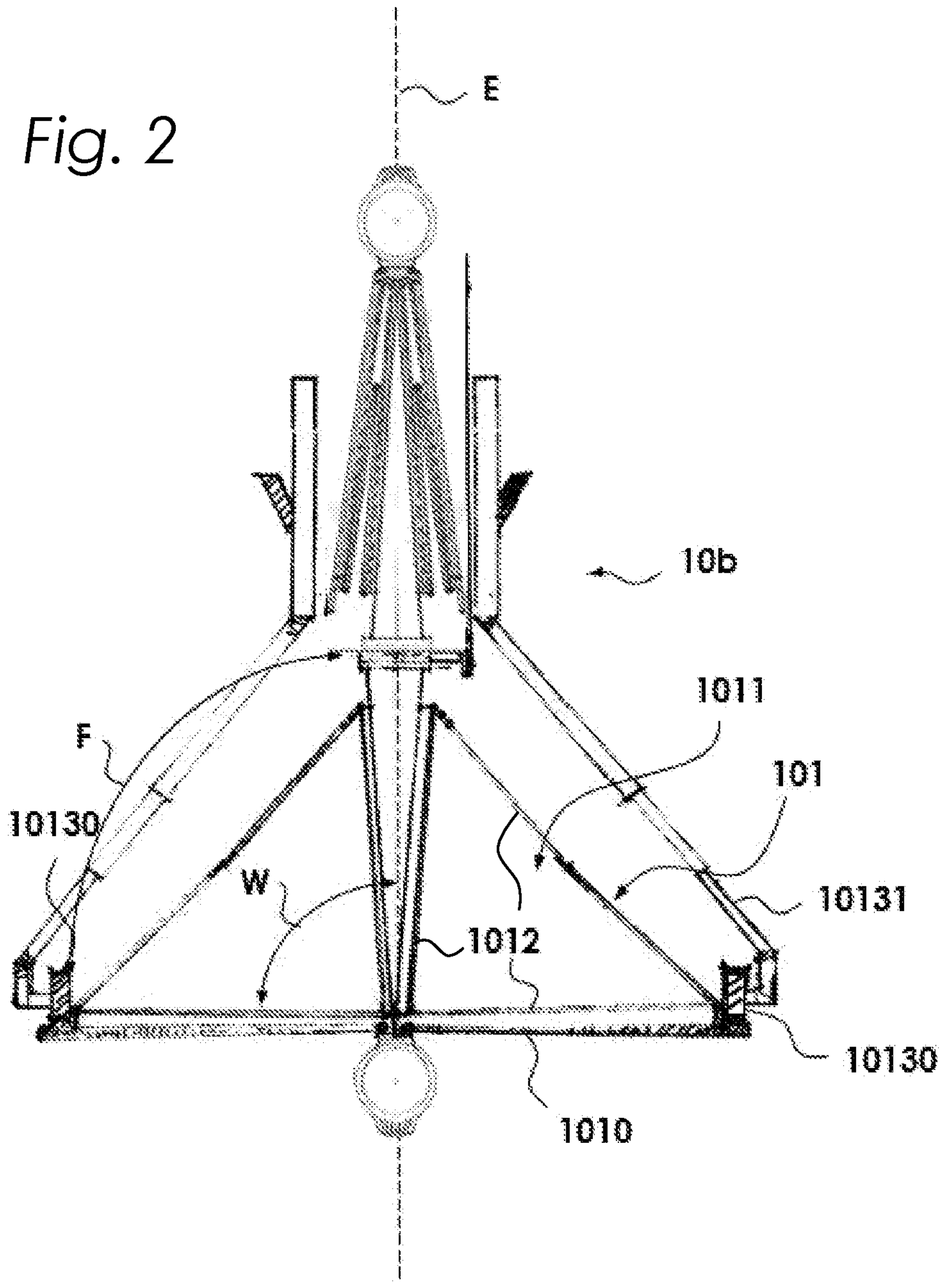
FIG. 2 shows a cross-sectional view of the wheel for an amphibious vehicle as in FIG. 1, wherein the pivotable profiles are folded out to form the buoyant cavity by means of the water-tight and flexible and/or elastic material.
Figure 3:
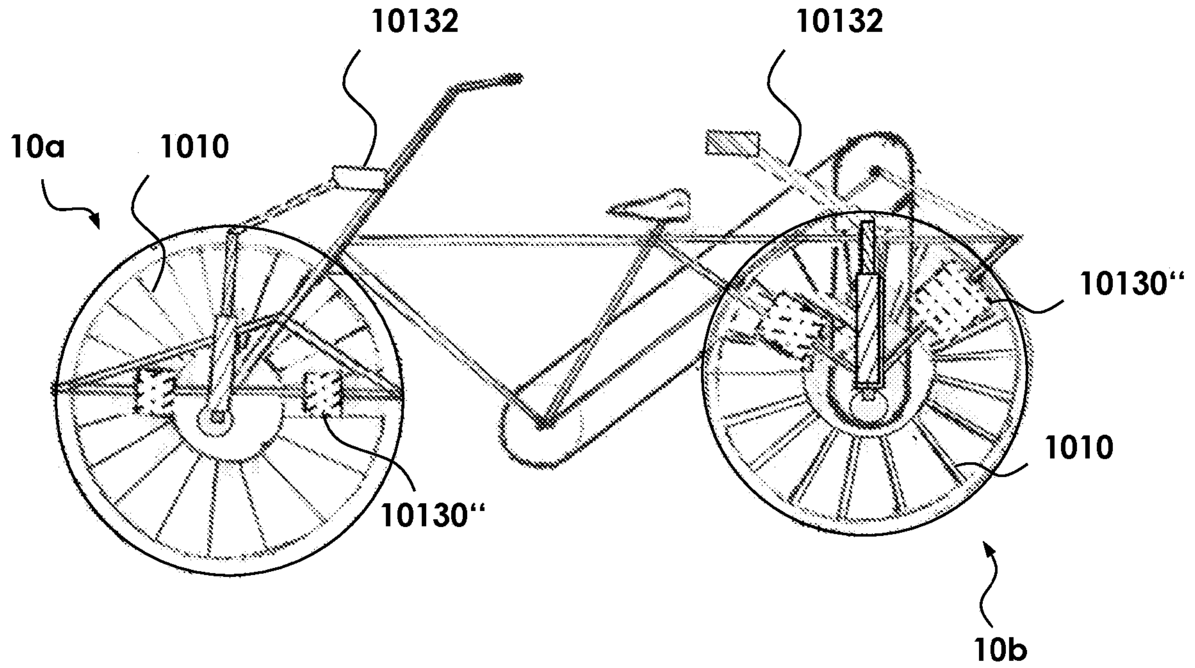
FIG. 3 shows a side view of two wheels on an amphibious vehicle with pivoted-in profiles.
Figure 4:
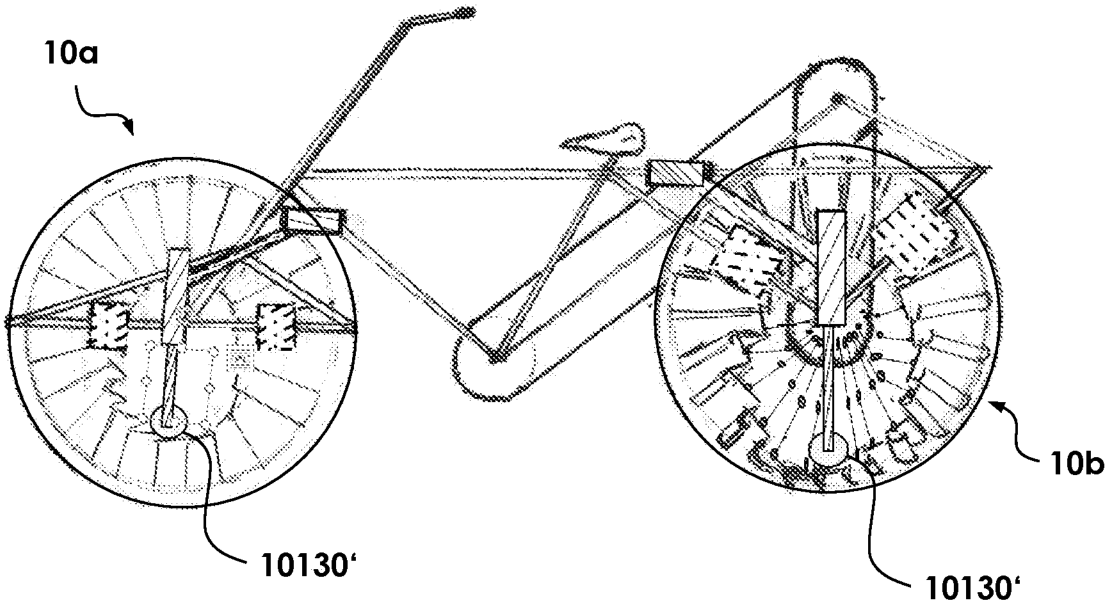
FIG. 4 shows a side view of two wheels on an amphibious vehicle with pivoted-out profiles.

As evident from FIG. 2, the material 1012 is stretched to form the cavity 1011 when the profiles 1010 are pivoted open.

In order to form the cavity 1011, it is not absolutely necessary that the profiles 1010 themselves are connected to one another in a water-tight manner, rather that a water-tight cavity is created by the material 1012 or the materials 1012 connected to the profiles 1010. In a further embodiment of the invention, the profiles 1010 themselves can however also be connected to one another in a water-tight manner.

In one advantageous embodiment of the invention, all the profiles 1010 provided on a wheel 10*a*, 10*b* are connected to one another in a water-tight manner on the float 101 by means of at least one water-tight and flexible and/or elastic material 1012 in order to form a buoyant cavity 1011 running around the circumference of the wheel 10*a*, 10*b*.

The material 1012 can furthermore be connected to the wheel 10*a*, 10*b* at at least one further region of the wheel 10*a*, 10*b* in order to form a circumferential buoyant cavity 1011 on the float 101.

In a further particularly advantageous embodiment of the invention, the profiles 1010 are arranged and/or designed to overlap at least to some extent, wherein in a further embodiment, the profiles 1010 can also be designed as vanes and/or blades and/or as elongate profiled bodies. Designing the profiles 1010 as blades enables the wheel 10, 10*b* to be used simultaneously as a floating means and as a drive means.

As is evident from the figures, at least one device 1013 is preferably provided, by means of which the profiles 1010 can be pivoted from their neutral position into a floating position provided at a defined angle W to the wheel plane E and vice versa.

In one particularly advantageous embodiment of the invention, the device 1013 is formed from at least one roll-shaped, spherical or wheel-shaped lever 10130 which bears against the inner circumference of the profiles 1010 and by means of which the profiles 1010 can be pivoted by means of pressure from their neutral position into a floating postilion provided at a defined angle W to the wheel plane E and vice versa.

Such levers 10130 can, for example, be attached to the outer edge of the profiles 1010 in a (preferably profile-free) region. In the present exemplary embodiment, the wheel 10*a*, 10*b* is provided e.g. with profiles 1010, which open, for example, in a hinge-like manner after passing through the bicycle fork or suspension due to the pressure of a roll-shaped, spherical or wheel-shaped lever 10130 which generates a downwards pressure and is pressed into the inside of the profiles 1010 (ideally at the edges). So that these profiles can pass through and contract/fold in again around the bicycle fork (or suspension), a second lever 10130 can be arranged for pressing in. A last lever 10130 can provided so that the pressure of the lever 10130 generating a downward pressure is not too high and the profiles 1010 do not open too early (in order to have the lowest frictional resistance, the corresponding material is installed with low frictional resistance).

The roll-shaped, spherical or wheel-shaped levers 10130 are preferably arranged on a pivotable lever arm 10131, by means of which the levers 10130 can be actuated along the guide path F of the pivotable profiles 1010.

In theory, other systems such as the air chamber technique, e.g. a two-way hinge with, for example, two downward pressure rollers could also be attached, in which the outer hinge provides for stabilization and propulsion with the fluted strips, and an inner hinge strip that prevents sinking (i.e. provides the buoyancy). However, this is superfluous here because of the air chamber technique. The previous present description employs the technique via an airtight fold-out (rubber) chamber.

The lever arm 10131 preferably has a hydraulic and/or telescopic design.

The device 1013 can comprise electrical, mechanical, hydraulic, chemical and/or magnetic means, by means of which the profiles 1010 can be pivoted from their neutral position into a floating position provided at a defined angle W to the wheel plane E and vice versa.

The floats 101 preferably comprise air/gas inlets and/or air/gas outlets as well as means to fill the buoyant cavity 1011, by means of which the buoyant cavity 1011 can be filled with air and/or gas.

The volume of each of the floats 101 or the buoyant cavities 1011 on the wheel 10*a*, 10*b* can preferably be variably adjusted.

Moreover, a control system can be provided, by means of which the pivoting process can be initiated and/or the volume of each of the floats 101 or the buoyant cavities 1011 on the wheel 10*a*, 10*b* can be variably adjusted.

While the front wheel 10*a* of an amphibious vehicle regularly only has a buoyancy function (+optional steering function), the rear wheel 10*b* can be used/over-extended mainly for propulsion and stabilization.

The wheels 10*a*, 10*b* of an amphibious vehicle with at least two wheels 10*a*, 10*b* are preferably designed to provide buoyancy for a person (if necessary, a larger wheel size would have to be selected to provide sufficient buoyancy and stabilization for heavy persons). The wheel 10*a*, 10*b* is therefore designed to be as large as possible but not unnecessarily large in order to have the necessary volume.

The spoke region of the wheel 10*a*, 10*b* can preferably be designed as an emergency volume that suffices to prevent complete sinking if any pedals that might be present are not in use.

In the case of the rear wheel 10*b*, which can have a stabilizing and propulsive effect, aluminum bars are advantageously employed, which are designed as a preferably semi-hollow profile and create a waterwheel-propulsion effect, i.e. propel the rear wheel 10*b*.

Figure 5:
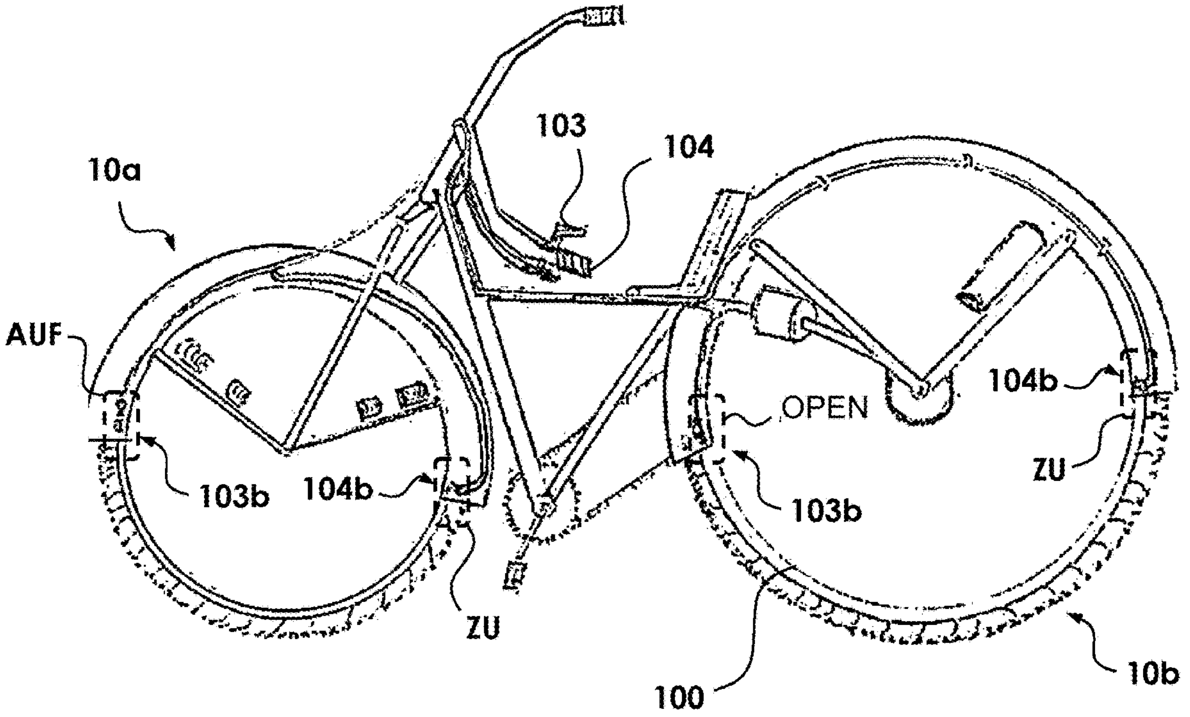
FIG. 5 shows a further exemplary embodiment, in which a mechanism is triggered in the rim part, preferably where the mudguard begins, which mechanism triggers the spreading action by flexural hinge technology and disengages it again by means of a snap mechanism.
Figure 6A:
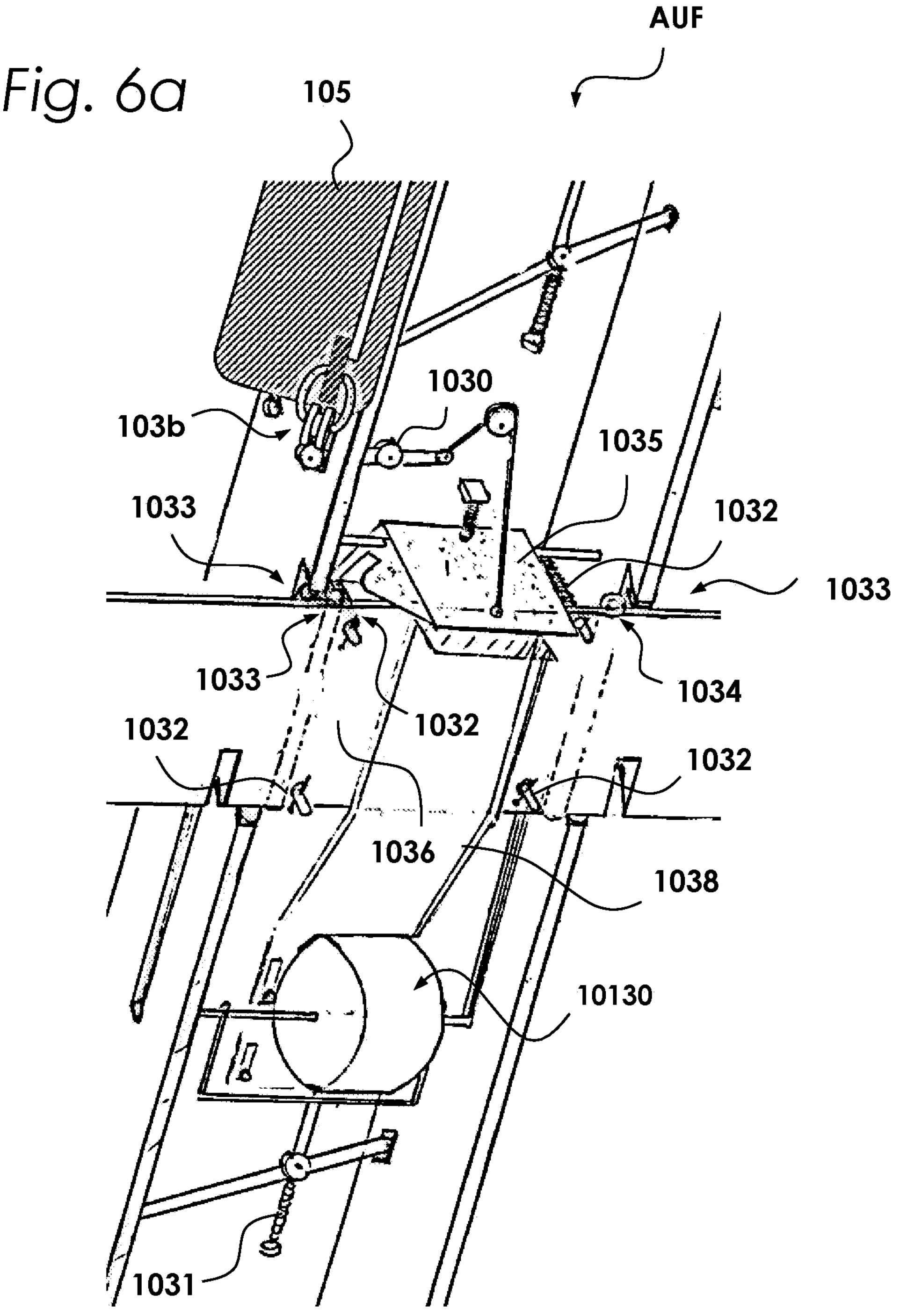
FIG. 6*a* shows the exemplary embodiment from FIG. 5 in an enlarged view in a zoom OPEN position, which triggers the spreading action.
Figure 6B:
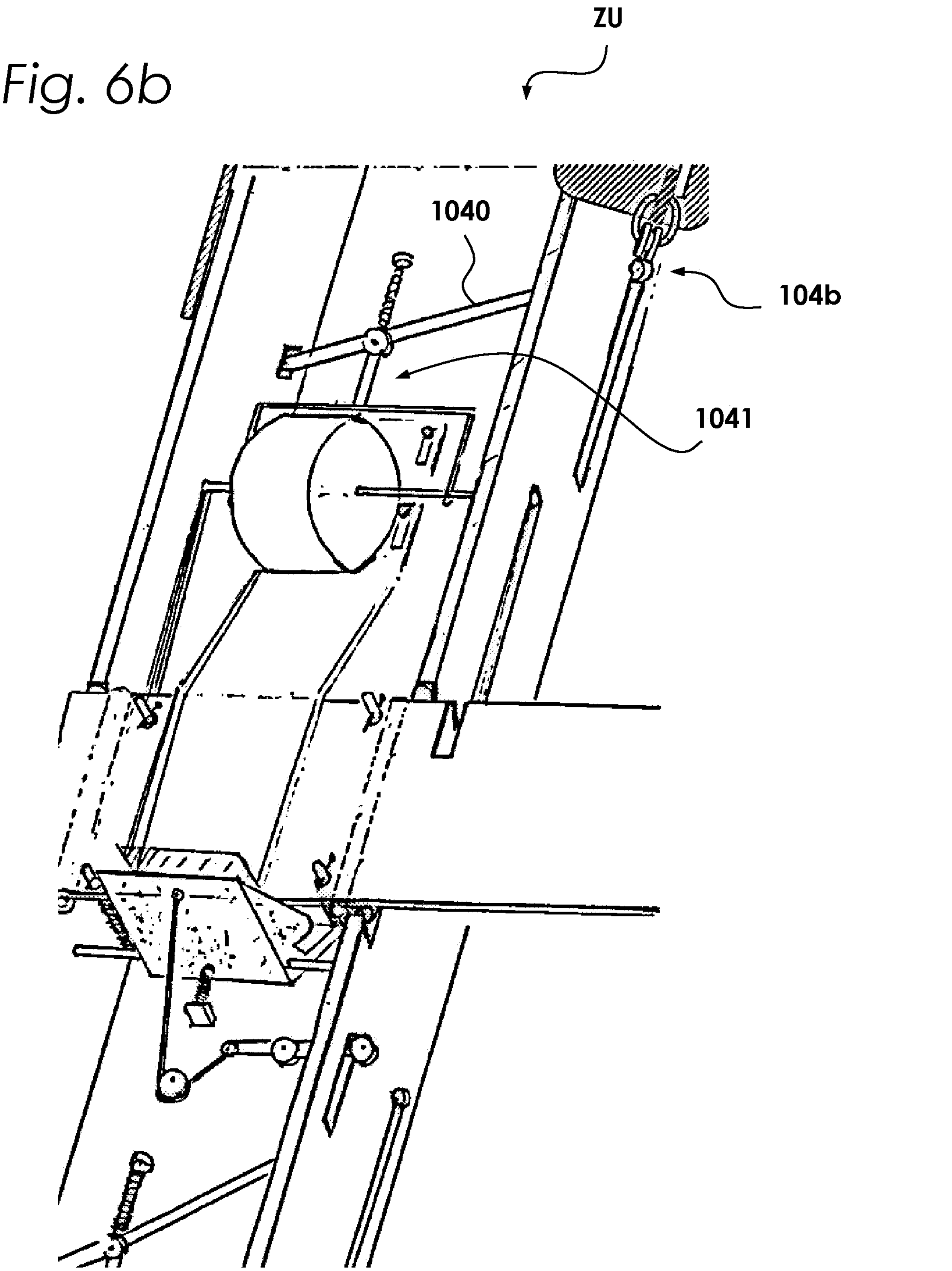
FIG. 6*b* shows the exemplary embodiment from FIG. 5 in an enlarged view in a zoom CLOSED position, which disengages the spreading action again.

FIG. 5 a further exemplary embodiment of the present invention, in which a mechanism is triggered in a rim (part) 100, preferably where the mudguard 105 beings, which mechanism triggers the spreading action by flexural hinge technology and disengages it again by means of a snap mechanism.

In this modification/improved version, the profiles 1010 (vanes and/or blades) for opening and closing are preferably activated from a mechanism within the rim 100, which is triggered by a control cable, a hydraulic system or in some other way by at least one OPEN switch 103.

The OPEN switch 103 (preferably a switch lever or some other mechanical and/or electrical switching element), which can advantageously be attached to or in the region of the steering wheel, activates an OPEN pressure roller 103*b*, which is preferably attached to the (more solid in each case) front mudguard and presses towards the rim (like a brake lever) and thus narrows the path to the rim such that the OPEN lock-release lever 1030 is pressed downwards and thus the lock is released (at the same time the head of the open lock-release lever 1030 disappears into the slot as seen here, so that the open pressure roller 103*b* can continue to run. The locking rocker 1035, thus disengaged under permanent pressure, clears the way to be exposed to the pressure of the compression springs 1032 and the profile-hinge combination 1036 therefore springs upwards (laterally delimited and guided by the sliding rollers 1033 and enabled by the spreading of the hinges 1034) and forms a continuous vane plane. In addition to the disengaged locking rocker, this process was also enabled by the 10130 lever (e.g. roller) which was then retracted by the press-in roller return spring 1031.

Closing mechanism: A CLOSE switch 104 (preferably a switch lever or some other mechanical and/or electrical switching element), which can also preferably be attached to the steering wheel, activates a closed pressure roller 104*b*, which is attached to the (more solid) rear mudguard, presses towards the rim 100 (like a brake lever-hydraulically by control cable or in some other way) and thus narrows the path to the rim such that the closed pressure lever 1040 is pressed downwards and disappears into the slot, so that the open pressure roller 104*b* can continue to run. In the process, the lever 10130 is pushed onto the profile platform 1038 by the press-in roller slide 1041 and the profile-hinge combination 1036 is pressed downwards again (and the vanes close again at the same time) until the locking rocker 1035 is re-engaged.

LIST OF REFERENCE SIGNS

10*a* (front) wheel
10*b* (rear) wheel
100 rim
101 float
102 tire contact area
103 OPEN switch
104 CLOSED switch
103*b* OPEN pressure roller
104*b* CLOSED pressure roller
1000 receiving means
1010 profiles
1011 cavity
1012 material
1013 device
1030 OPEN lock/release lever
1031 press-in roller return spring
1032 permanent compression springs (adjustable) and locking pin
1033 sliding rollers
1034 hinges

1035 locking rocker
1036 profile-hinge combination
1038 profile platform
1040 closed pressure lever
1041 press-in roller slide
10130 lever
10130' lever for pivoting out/opening the profiles
10130" lever for pivoting in/closing the profiles
10131 lever arm
10132 operator control part for lever arm
E wheel plane
F guide path
W angle

The invention claimed is:

1. A wheel (10*a*, 10*b*) for an amphibious vehicle (1), comprising:
a rim (100) and a tire contact area (102) for travelling over solid ground; and
a float (101) designed to hold air and/or gas,
wherein the float can be brought from a neutral position into a floating position,
wherein the float (101) is formed from
a plurality of profiles (1010) pivotable at a defined angle (W) to a wheel plane (E) on a circumference of the rim (100) and/or on a circumference of a receiving means (1000) extending inside an inner circumference of the rim (100), and
a water-tight and flexible and/or elastic material (1012) arranged on the profiles (1010) and/or being connected to the profiles (1010) to form a buoyant cavity (1011).

2. The wheel (10*a*, 10*b*) according to claim 1,
wherein the profiles (1010) are arranged and/or designed to overlap at least to some extent.

3. The wheel (10*a*, 10*b*) according to claim 1,
wherein a device (1013) is provided, by which the profiles (1010) can be pivoted from their neutral position into a floating position provided at a defined angle (W) to the wheel plane (E) and vice versa.

4. The wheel (10*a*, 10*b*) according to claim 3,
wherein the device (1013) includes roll-shaped, spherical or wheel-shaped levers (10130),
wherein the roll-shaped, spherical or wheel-shaped levers (10130) bear against the inner circumference of the profiles (1010), and
wherein the profiles (1010) can be pivoted by pressure exerted by the roll-shaped, spherical or wheel-shaped levers (10130) from their neutral position into a floating position provided at a defined angle (W) to the wheel plane (E) and vice versa.

5. The wheel (10*a*, 10*b*) according to claim 4,
wherein the roll-shaped, spherical or wheel-shaped levers (10130) are arranged on a pivotable lever arm (10131), and
wherein the levers (10130) can be actuated by the pivotable lever arm (10131) along a guide path (F) of the profiles (1010).

6. The wheel (10*a*, 10*b*) according to claim 5,
wherein the pivotable lever arm (10131) has a hydraulic and/or telescopic design.

7. The wheel (10*a*, 10*b*) according to claim 3,
wherein the device (1013) comprises electrical, mechanical, hydraulic, chemical and/or magnetic means, by which the profiles (1010) can be pivoted from their neutral position into a floating position provided at a defined angle (W) to the wheel plane (E) and vice versa.

8. The wheel (10*a*, 10*b*) according to claim 1,
wherein the float (101) comprises air/gas inlets and/or air/gas outlets as well as means for filling the buoyant cavity (1011), by which the buoyant cavity (1011) can be filled with air and/or gas.

9. The wheel (10*a*, 10*b*) according to claim 1,
wherein all the profiles (1010) provided on the wheel (10*a*, 10*b*) are connected to one another in a water-tight manner on the float (101) by the water-tight and flexible and/or elastic material (1012) in order to form the buoyant cavity (1011) running around the circumference of the wheel (10*a*, 10*b*).

10. The wheel (10*a*, 10*b*) according to claim 1,
wherein the material (1012) is connected to the wheel (10*a*, 10*b*) at a further region of the wheel (10*a*, 10*b*) in order to form the buoyant cavity (1011) on the float (101).

11. The wheel (10*a*, 10*b*) according to claim 1,
wherein a volume of the float (101) or the buoyant cavity (1011) on the wheel (10*a*, 10*b*) can be variably adjusted.

12. The wheel (10*a*, 10*b*) according to claim 1, further comprising
a control system by which a pivoting process can be initiated and/or a volume of the float (101) or the buoyant cavity (1011) on the wheel (10*a*, 10*b*) can be variably adjusted.

13. The wheel (10*a*, 10*b*) according to claim 1,
wherein the profiles (1010) are blades, and
wherein the profiles (1010) contract/fold in to generate a propulsive force and open in a hinge-like manner after passing through a bicycle fork.

14. The wheel (10*a*, 10*b*) according to claim 1,
wherein the profiles (1010) for opening and closing are activated from a mechanism within the rim (100), and
wherein the mechanism is triggered by a control cable or a hydraulic system by an OPEN switch 104*b*.

* * * * *